Figure 1:
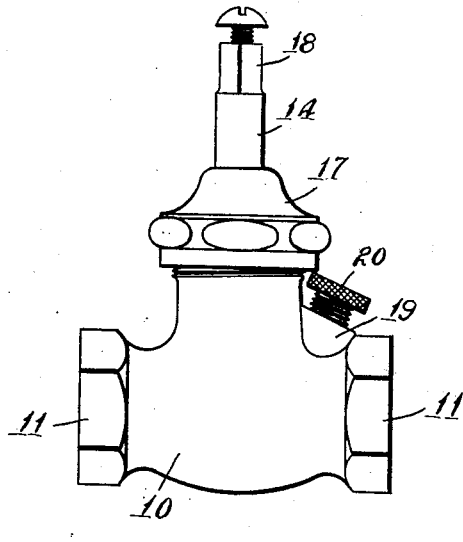

W. H. SMITH.
STOP AND WASTE VALVE.
APPLICATION FILED JULY 31, 1919.

1,331,535.

Patented Feb. 24, 1920.

Inventor
William H. Smith.
By Hull Smith Brock & West
Attys.

UNITED STATES PATENT OFFICE.

WILLIAM H. SMITH, OF EAST CLEVELAND, OHIO.

STOP AND WASTE VALVE.

1,331,535.      Specification of Letters Patent.      Patented Feb. 24, 1920.

Application filed July 31, 1919. Serial No. 314,444.

*To all whom it may concern:*

Be it known that I, WILLIAM H. SMITH, a citizen of the United States, residing at East Cleveland, in the county of Cuyahoga and State of Ohio, have invented a certain new and useful Improvement in Stop and Waste Valves, of which the following is a full, clear, and exact description, reference being had to the accompanying drawings.

This invention relates generally to valves and more particularly to one of the compression type provided with a waste passage.

Valves of this type are usually constructed with a bonnet which in turn has been provided with a lateral extension which is bored and threaded and adapted to receive a screw plug by means of which the waste passage is closed or opened as desired as shown in my Patent No. 1,287,126, of December 10, 1918.

These features of construction are objectionable for the reason that they are expensive as they require an additional amount of metal and a corresponding additional amount of labor in shaping and finishing the same.

The object of my invention, therefore, is to eliminate these objections by placing the waste plug in the valve housing itself and more particularly in such a position as to prevent loss of the plug and yet be readily accessible for opening and closing in whatever position the valve is attached.

The invention consists in the novel features of construction hereinafter fully described and set forth in the appended claims.

In the drawings forming part of this specification I have shown one embodiment of my inventive idea but it will be understood that other forms may be employed without departing from the broad principles of the invention as defined in the claims.

Figure 2:
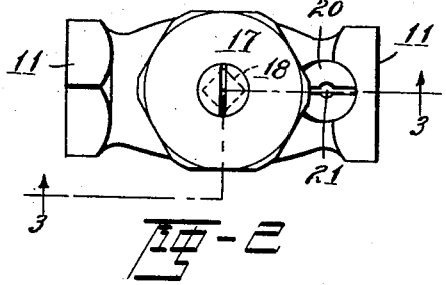

Figure 1 is a side elevation of my improved valve; Fig. 2 is a top plan view thereof and Fig. 3 is a section on the line 3—3 of Fig. 2.

The body of the valve 10 is provided with the usual threaded ends 11 for connection in the pipe line and the usual form of valve seat 12 upon which the valve 13 is adapted to seat, this valve being of the usual or any approved construction, the stem 14 thereof extending through the washer 15, gasket 16 and cap 17 and suitably shaped as at 18 for the reception of any suitable handle.

A projection 19, preferably cast integrally with the valve body 10 and located between one of the threaded ends 11 and the neck of the casing, is bored and threaded for the reception of the waste plug 20. This plug 20 has a passage 21 through which waste can escape when the plug is unseated as shown in Fig. 3, the end of the plug having a tapered end 22 adapted to engage the tapered seat 23.

Figure 3:
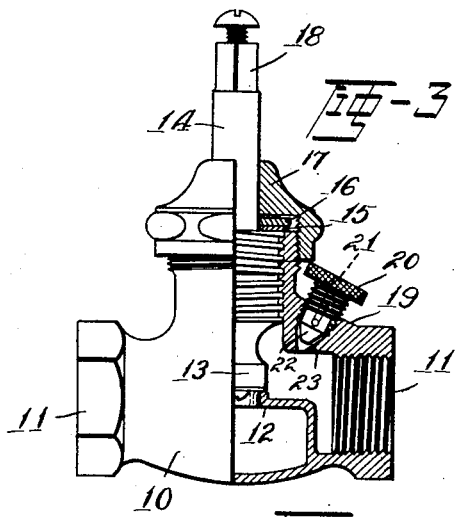

The projection 19 is bored at such an angle with the vertical axis as to allow the top of the plug 20 to engage the underside of the cap 17 as shown in Figs. 1 and 3 and thereby prevent the plug 20 from entirely unscrewing from the projection 19 when the valve is assembled, while still affording sufficient freedom for the opening and closing of the same. This plug 20 also being in the same plane with the valve stem and pipe will be equally accessible whichever way the valve is turned, and will be equally accessible with the valve handle since it faces in the same direction. This is the main feature of my invention since it prevents loss of the waste plug in a novel and unique way, offers a simple construction and readily accessible waste plug at all times.

Having thus described my invention, what I claim is:

1. A valve of the kind described comprising a body portion having an internally threaded projection located between the neck and outlet of the valve and a waste plug threaded in said projection adapted to abut the underside of the valve cap when said plug is in the extreme open position.

2. A valve of the kind described comprising a body portion having an internally threaded projection and a waste plug threaded in said projection and adapted to abut the underside of the valve cap when said plug is in the open position.

3. A valve of the kind described comprising a body portion having an internally threaded projection located in a plane with the valve stem and pipe line, a waste plug threaded in said projection and means abutting the head of said plug when in the open position to prevent the removal of said plug from said projection.

4. A valve of the kind described comprising a body portion having a projection located in a plane with the valve stem and pipe line, a waste plug adapted to coöperate with said projection and means carried by said body portion adapted to coöperate with the head of said plug to prevent the loss thereof.

In testimony whereof I hereunto affix my signature.

WILLIAM H. SMITH.